United States Patent
Suzuki et al.

(10) Patent No.: US 10,703,238 B2
(45) Date of Patent: Jul. 7, 2020

(54) SEAT COVER AND VEHICLE SEAT

(71) Applicant: TACHI-S CO., LTD., Tokyo (JP)

(72) Inventors: Takahiko Suzuki, Tokyo (JP); Katsunori Nagaoka, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 16/072,998

(22) PCT Filed: Oct. 31, 2016

(86) PCT No.: PCT/JP2016/082337
§ 371 (c)(1),
(2) Date: Jul. 26, 2018

(87) PCT Pub. No.: WO2017/138196
PCT Pub. Date: Aug. 17, 2017

(65) Prior Publication Data
US 2019/0031063 A1  Jan. 31, 2019

(30) Foreign Application Priority Data
Feb. 9, 2016  (JP) .................................. 2016-023013

(51) Int. Cl.
*B60N 2/60* (2006.01)
*B60N 2/58* (2006.01)
*A47C 31/02* (2006.01)

(52) U.S. Cl.
CPC ......... *B60N 2/5883* (2013.01); *B60N 2/5825* (2013.01); *A47C 31/02* (2013.01)

(58) Field of Classification Search
CPC .............................. B60N 2/5883; A47C 31/02
(Continued)

(56) References Cited

U.S. PATENT DOCUMENTS 3,233,253 A * 2/1966 Cauvin ..................... A47C 3/12
5/402
5,893,579 A * 4/1999 Kimura ................ B60N 2/5825
280/728.3
(Continued)

FOREIGN PATENT DOCUMENTS

CN 101754925 A 6/2010
CN 105034884 A 11/2015
(Continued)

OTHER PUBLICATIONS

Jan. 24, 2017, International Search Report issued for related PCT Application No. PCT/JP2016/082337.
(Continued)

*Primary Examiner* — Syed A Islam
(74) *Attorney, Agent, or Firm* — Paratus Law Group, PLLC

(57) ABSTRACT

Provided is a seat cover (5) of a vehicle seat (1) which is formed by sewing a plurality of skin materials includes: a locked part (23) which is provided in a sewn portion (12) of two sheets of sewn skin materials (10 and 11) and is locked in a locking part (22) of a cushion pad in a state where the sewn portion is pulled into a cushion pad (20). Among seam allowances of the skin materials included in the sewn portion, a seam allowance (14) of one skin material includes a protrusion part (15) which is arranged to protrude in a pulling-in direction of the sewn portion from a seam allowance (13) of the other skin material. The locked part is directly provided in the protrusion part.

6 Claims, 7 Drawing Sheets

(58) Field of Classification Search
USPC .......................... 297/218.2, 452.6–452.62
See application file for complete search history.

(56) References Cited

U.S. PATENT DOCUMENTS

| | | | | |
|---|---|---|---|---|
| 7,506,939 | B2* | 3/2009 | Brockschneider | B60N 2/5825 297/218.2 |
| 7,588,290 | B2* | 9/2009 | Takezawa | B60N 2/5825 297/218.2 |
| 8,733,834 | B2* | 5/2014 | Palmer | B60N 2/585 297/218.1 |
| 8,814,262 | B2* | 8/2014 | Abe | A47C 7/74 297/180.11 |
| 9,440,569 | B2* | 9/2016 | Okugawa | B60N 2/5891 |
| 9,776,353 | B2* | 10/2017 | Kheil | B29C 43/28 |
| 10,500,995 | B2* | 12/2019 | Ohtsu | B60N 2/5883 |
| 2002/0101109 | A1* | 8/2002 | Stiller | B60N 2/5825 297/452.6 |
| 2010/0181818 | A1 | 7/2010 | Mashimo | |
| 2015/0307000 | A1 | 10/2015 | Kozaki | |
| 2019/0232835 | A1* | 8/2019 | Murakami | B60N 2/565 |

FOREIGN PATENT DOCUMENTS

| | | |
|---|---|---|
| JP | S59-029999 U | 2/1984 |
| JP | 2003-009996 A | 1/2003 |
| JP | 2013-106774 A | 6/2013 |
| JP | 2015-097597 A | 5/2015 |
| JP | 5776979 B2 | 9/2015 |

OTHER PUBLICATIONS

Jan. 24, 2017, International Search Opinion issued for related PCT Application No. PCT/JP2016/082337.

Mar. 27, 2020, Chinese Office Action issued for related CN Application No. 201680081511.8.

* cited by examiner

SEAT COVER AND VEHICLE SEAT

CROSS REFERENCE TO PRIOR APPLICATION

This application is a National Stage Patent Application of PCT International Patent Application No. PCT/JP2016/082337 (filed on Oct. 31, 2016) under 35 U.S.C. § 371, which claims priority to Japanese Patent Application No. 2016-023013 (filed on Feb. 9, 2016), which are all hereby incorporated by reference in their entirety.

TECHNICAL FIELD

The present invention relates to a seat cover and a vehicle seat.

BACKGROUND ART

A vehicle seat generally includes a cushion pad and a seat cover which covers the cushion pad. The seat cover is produced by sewing a plurality of skin materials. Further, the sewn portion of two sheets of sewn skin materials is pulled into a pulling-in groove of the cushion pad so as to improve a fitting property of the seat cover with respect to the cushion pad.

In the vehicle seat described in Patent Document 1, a wire which extends along the sewn portion of the two sheets of sewn skin materials is provided in the seat cover, and the wire is stored in a cylindrical hanging bag which is sewn integrally with the two sheets of skin materials. Further, a wire is provided on the bottom of the pulling-in groove of the cushion pad, and the wire of the seat cover is connected with the wire of the cushion pad by a hook ring, and the sewn portion of the two sheets of skin materials is pulled into the pulling-in groove of the cushion pad.

RELATED ART REFERENCE

Patent Document

Patent Document 1: Japanese Patent No. 5776979

SUMMARY OF THE INVENTION

Problems to be Solved by the Invention

In the vehicle seat described in Patent Document 1, each of the sewn portions of the two sheets of sewn skin materials requires the wire and the hanging bag which stores the wire, resulting in an increase the number of the component.

The hanging bag integrally sewn on the two sheets of skin materials is overlapped with the seam allowances of the two sheets of skin materials, resulting in thickening the sewn portion pulled into the pulling-in groove of the cushion pad. For this reason, there is a concern that the pulling-in of the sewn portion to the pulling-in groove is hindered.

In consideration of an operability at the time of inserting the wire to the hanging bag, the inner dimension of the hanging bag is set to be larger than the diameter of the wire. However, as a result, the hanging bag hangs down to the pulling-in groove side from the seam allowances of the two sheets of skin materials, and the pulling-in groove becomes deep to remove the looseness of the hanging bag. For this reason, there is a concern that the operability deteriorates at the time of connecting the wire stored in the hanging bag with the wire provided in the bottom of the pulling-in groove.

The invention has been made in consideration of the above situation, and an object thereof is to provide a seat cover and a vehicle seat in which the number of components and a workload can be reduced which are required to pull in a sewn portion of two sheets of sewn skin materials.

Means for Solving the Problems

According to an aspect of the invention, a seat cover which is formed by sewing a plurality of skin materials includes a locked part which is provided in a sewn portion of two sheets of sewn skin materials and is locked in a locking part of a cushion pad in a state where the sewn portion is pulled into the cushion pad of a seat covered with the seat cover. Among seam allowances of two sheets of skin materials included in the sewn portion, a seam allowance of one skin material includes a protrusion part which is arranged in at least partial section in an extending direction of the seam allowance to protrude in a pulling-in direction of the sewn portion from a seam allowance of the other skin material, and the locked part is directly provided in the protrusion part.

According to an aspect of the invention, a vehicle seat includes: the seat cover; and a cushion pad covered with the seat cover. The cushion pad is provided with a pulling-in groove to which the sewn portion of the seat cover is pulled in, and a locking part which is provided in the pulling-in groove and locks the locked part of the sewn portion pulled into the pulling-in groove.

Advantages of the Invention

According to the invention, the seat cover and the vehicle seat can be provided in which the number of components and the workload can be reduced which are required to pull in the sewn portion of the two sheets of sewn skin materials.

MODES FOR CARRYING OUT THE INVENTION

Figure 1:
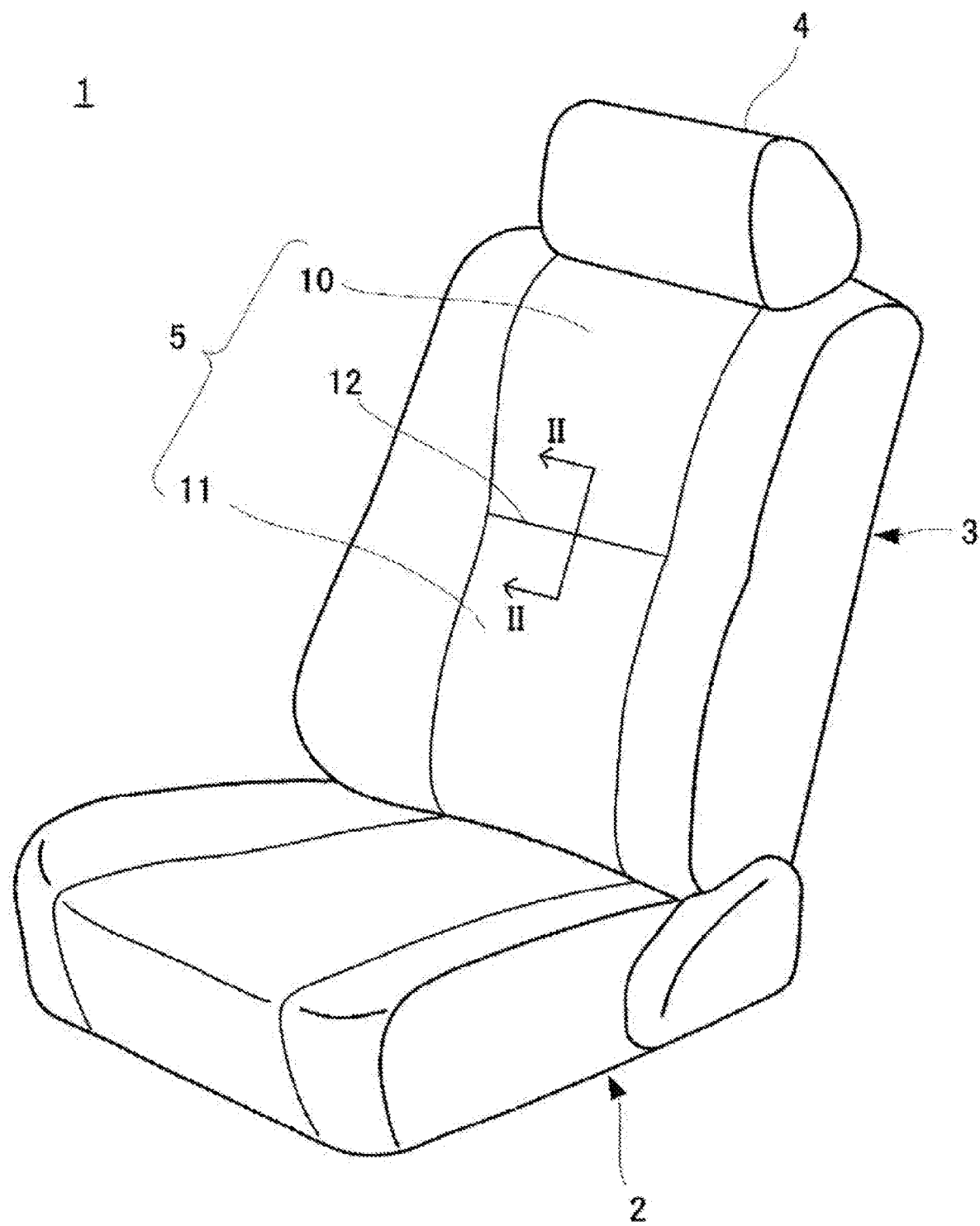
FIG. 1 is a perspective view illustrating one example of a seat cover and a vehicle seat for describing an embodiment of the invention.

FIG. 1 illustrates a configuration of one example of the vehicle seat for describing the embodiment of the invention.

The vehicle seat 1 illustrated in FIG. 1 includes a seat cushion 2 which configures a seat surface portion, a seat back 3 which configures a backrest portion, and a headrest 4 which supports a head of an occupant sitting on the seat.

The seat cushion 2, the seat back 3, and the headrest 4 each include a cushion pad which is formed of a foam material such as a polyurethane foam and a frame which supports the cushion pad. Further, the cushion pad of the seat cushion 2 and the cushion pad of the seat back 3 are integrally covered with the seat cover 5, and the headrest 4 is also covered with a seat cover separately from the seat cover 5.

Incidentally, the cushion pad of the seat cushion 2 and the cushion pad of the seat back 3 may be covered with the separate seat covers. Further, in a case where the headrest 4 is a fixed-type headrest and is configured to be integrated with the seat back 3, the cushion pad of the headrest 4 may be covered with one seat cover to be integrated with the cushion pad of the seat back 3 or to be integrated with the cushion pad of the seat cushion 2 and the cushion pad of the seat back 3.

The seat cover 5 is formed by sewing a plurality of skin materials in a bag shape. For example, a leather (a natural leather or a synthetic leather) or a fabric (a textile fabric, a knitted fabric, or a non-woven cloth) is used as a skin material. The skin material may have a monolayer structure of a leather or a fabric. A leather or a fabric as a front fabric may have a multilayer structure in which a wadding (for example, a resin foam such as an elastically deformable flexible polyurethane foam) is stacked on the leather or the fabric.

Among the plurality of skin materials forming the seat cover 5, two sheets of a skin material 10 and a skin material 11 are skin materials which cover the center support portion of the substantially widthwise central portion of the seat back 3, and the skin material 10 and the skin material 11 are sewn with each other. A sewn portion 12 of the skin material 10 and the skin material 11 sewn with each other is pulled into the cushion pad of the seat back 3.

Figure 2:
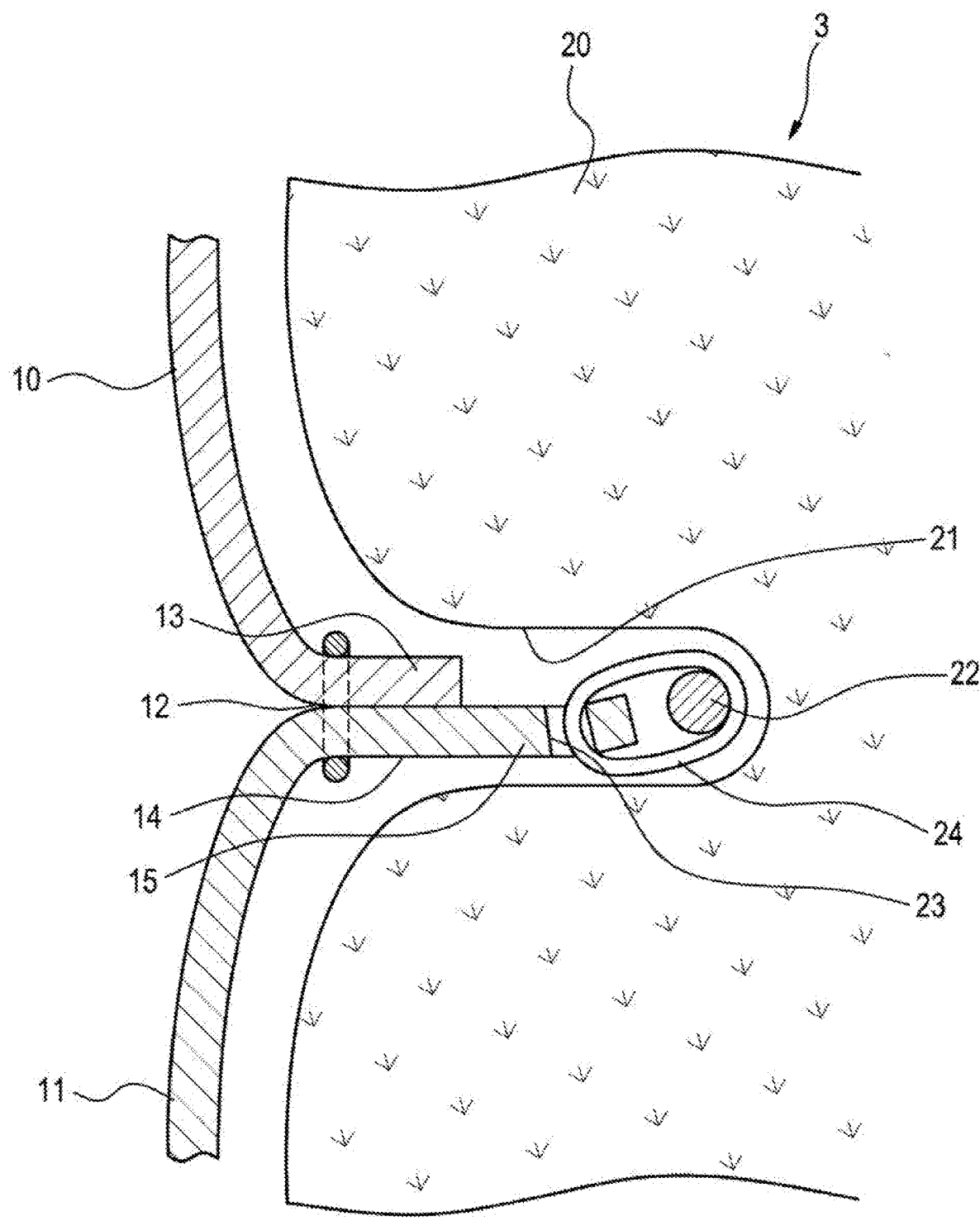
FIG. 2 is a sectional view taken along line II-II of the vehicle seat of FIG. 1.
Figure 3:
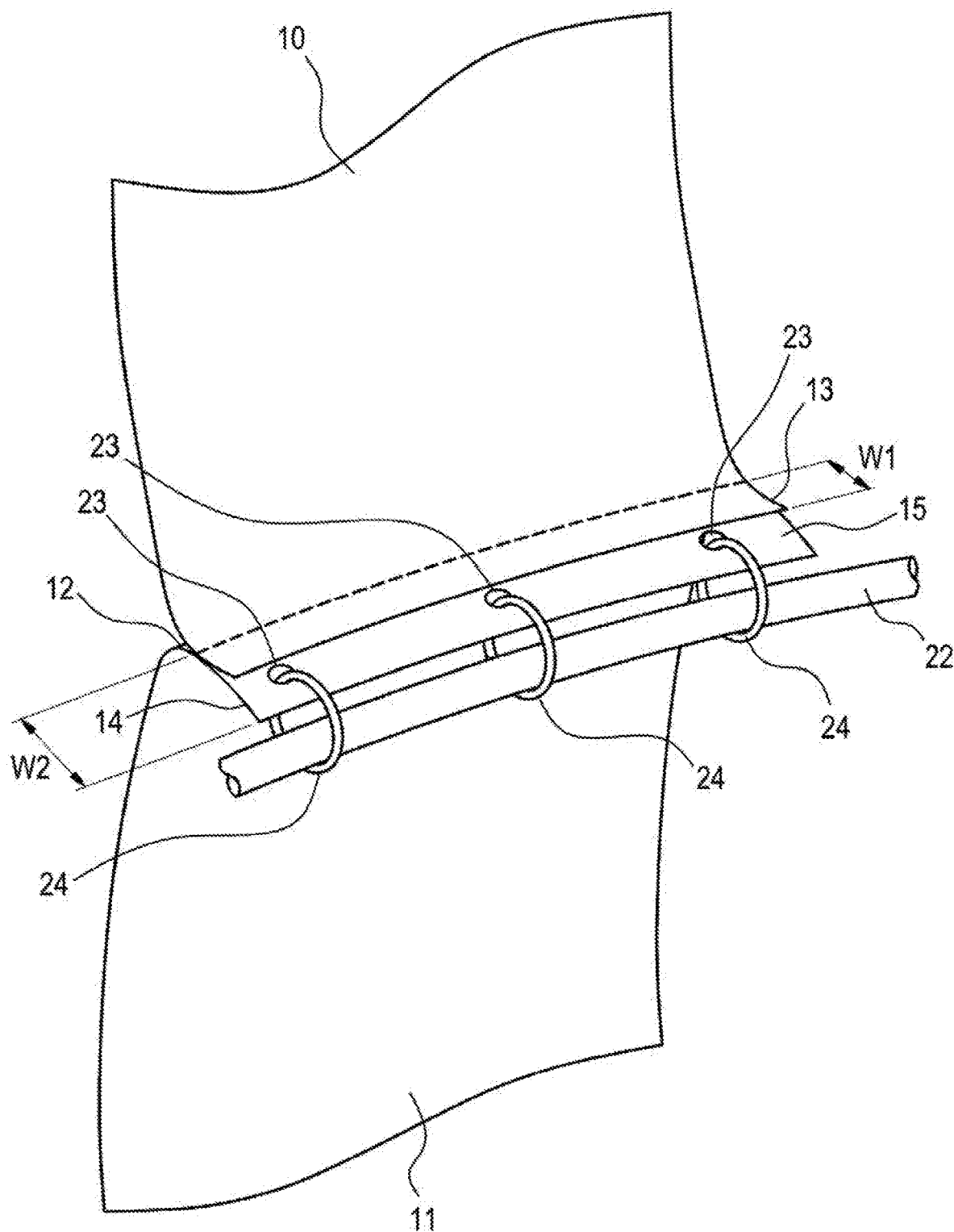
FIG. 3 is a perspective view of a back surface side of the seat cover of FIG. 1.

Hereinafter, the configurations of the sewn portion 12 of the skin material 10 and the skin material 11 and the portion, which the sewn portion 12 pulls in, of the cushion pad of the seat back 3 are described with reference to FIGS. 2 and 3. However, properly, the same configuration is also applied to the sewn portion of other two sheets of skin materials, which are sewn to each other, of the seat cover 5 and the cushion pad portion which the sewn portion pulls in properly.

A pulling-in groove 21 which extends along the sewn portion 12 of the skin material 10 and the skin material 11 and a wire 22 as a locking part arranged in the bottom of the pulling-in groove 21 are provided in the cushion pad 20 of the seat back 3.

A protrusion part 15 which is arranged to protrude from the seam allowance 13 of the skin material 10 in a pulling-in direction of the sewn portion 12 to the pulling-in groove 21 is provided in the seam allowance 14 of the skin material 11 among the seam allowance 13 of the skin material 10 and the seam allowance 14 of the skin material 11 which are included in the sewn portion 12. Incidentally, in the illustrated example, the protrusion part 15 extends over the entire length of the seam allowance 14 of the skin material 11 in the extending direction. However, the protrusion part 15 may be provided in at least partial section of the seam allowance 14 in the extending direction.

In this example, a seam allowance width W2 of the seam allowance 14 of the skin material 11 of the section provided with the protrusion part 15 is larger than a seam allowance width W1 of the seam allowance 13 of the skin material 10, and the protrusion part 15 is provided in the seam allowance 14.

A plurality of holes 23 as a locked part which is locked in the wire 22 provided in the pulling-in groove 21 are bored with a proper interval interposed in the extending direction of the protrusion part 15 in the protrusion part 15 of the seam allowance 14.

Hook rings 24 are inserted into the respective holes 23 provided with the protrusion part 15, and the hook rings 24 are caulked by the wire 22 provided in the pulling-in groove 21. The protrusion part 15 is connected with the wire 22 through the hook ring 24, and the sewn portion 12 of the skin material 10 and the skin material 11 including the protrusion part 15 is pulled into the pulling-in groove 21 by the tension of the wire 22.

In the above-described seat cover 5, the plurality of holes 23 as a locked part locked in the wire 22 of the pulling-in groove 21 are directly provided in the seam allowance 14 of the skin material 11 configuring the sewn portion 12. Thus, the number of the components can be reduced compared to a case where the wire as a locked part and a hanging bag which stores the wire are provided in each of the sewn portions 12 similarly.

The hole 23 as a locked part is directly provided in the protrusion part 15 of the seam allowance 14 of the skin material 11, and the protrusion part 15 is arranged to protrude from the seam allowance 13 of the skin material 10. Thus, the sewn portion 12 can be thin compared to a case where the hanging bag is overlapped with the seam allowance 13 of the skin material 10 and the seam allowance 14 of the skin material 11 to be integrally sewn on the skin material 10 and the skin material 11. Accordingly, the sewn portion 12 is smoothly pulled into the pulling-in groove 21, thereby reducing the workload required for the pulling-in.

Preferably, the hole 23 as a locked part is directly provided in the protrusion part 15 of the seam allowance 14 of the skin material 11, so that the looseness of the seam allowance 14 is reduced when the sewn portion 12 is pulled into the pulling-in groove 21. Thus, the pulling-in groove 21 can be shallow compared to a case where the looseness of the hanging bag is removed which hangs down to the pulling-in groove side from the seam allowance 13 of the skin material 10 and the seam allowance 14 of the skin material 11. Accordingly, it is possible to reduce the workload at the time of connecting the protrusion part 15 of the seam allowance 14 with the wire 22 of the pulling-in groove 21.

Figure 4:
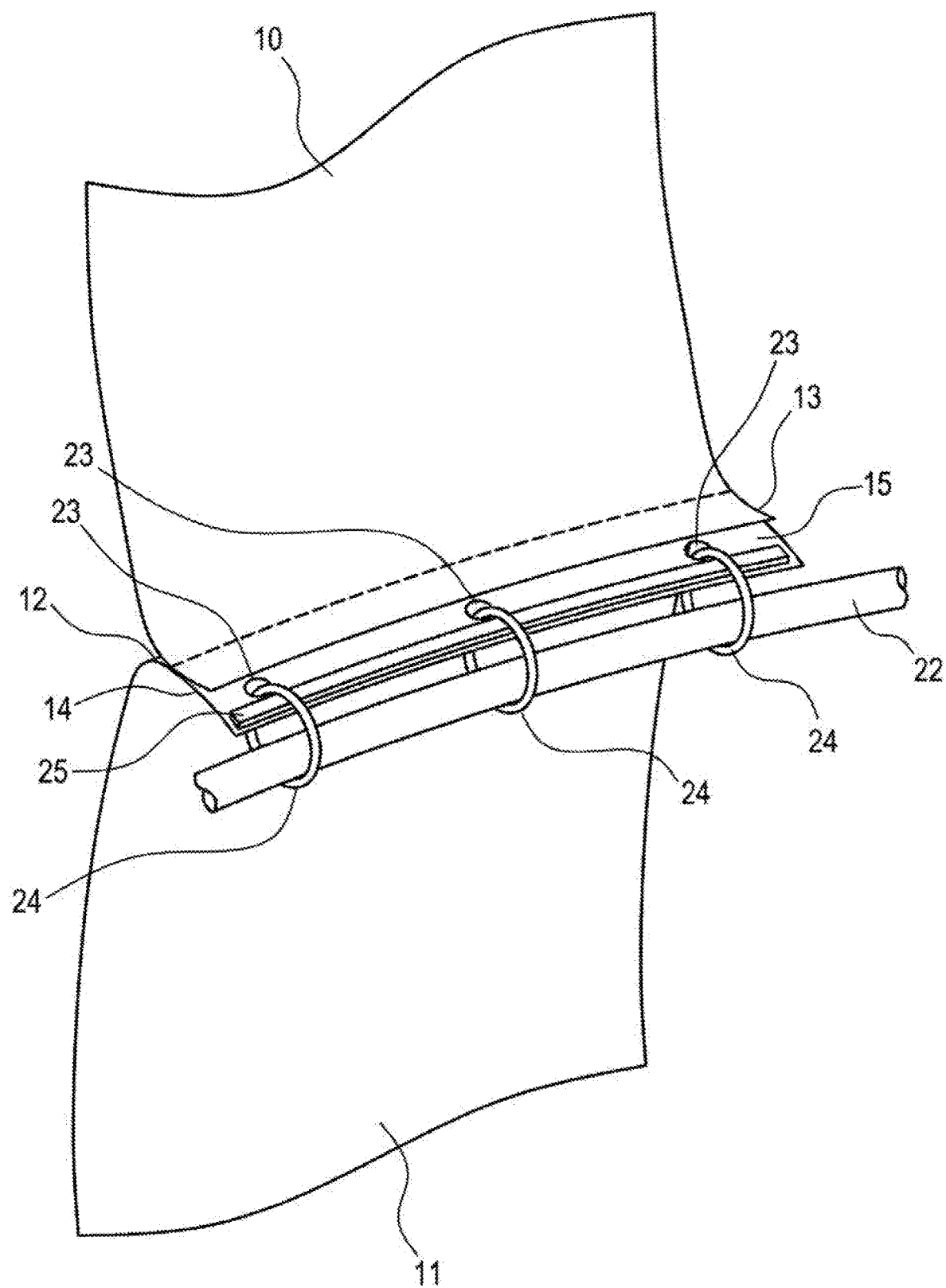
FIG. 4 is a perspective view of a back surface side of a modification of the vehicle seat of FIG. 1.

FIG. 4 illustrates a configuration of a modification of the seat cover 5, and a reinforcement member 25 is joined to the edge portion of the protrusion part 15. For example, the reinforcement member 25 is a resin plate material, and is joined to the edge portion of the protrusion part 15 by sewing or adhering. It can be suppressed by the reinforcement member 25 that the raveling or the rupture of the edge portion of the protrusion part 15 occurs due to a stretch by the hook ring 24 inserted into the hole 23.

Incidentally, the reinforcement member 25 may be provided at least in the edge of the protrusion part 15 in the vicinity of each of the hole 23, and may be provided to surround the hole 23, for example. In addition, a plurality of the reinforcement members 25 may be provided in each of the holes 23. However, as illustrated as an example, the reinforcement members 25 are preferably provided across the plurality of holes 23 from a viewpoint to reduce the workload for joining the reinforcement member 25 with the protrusion part 15.

Figure 5:
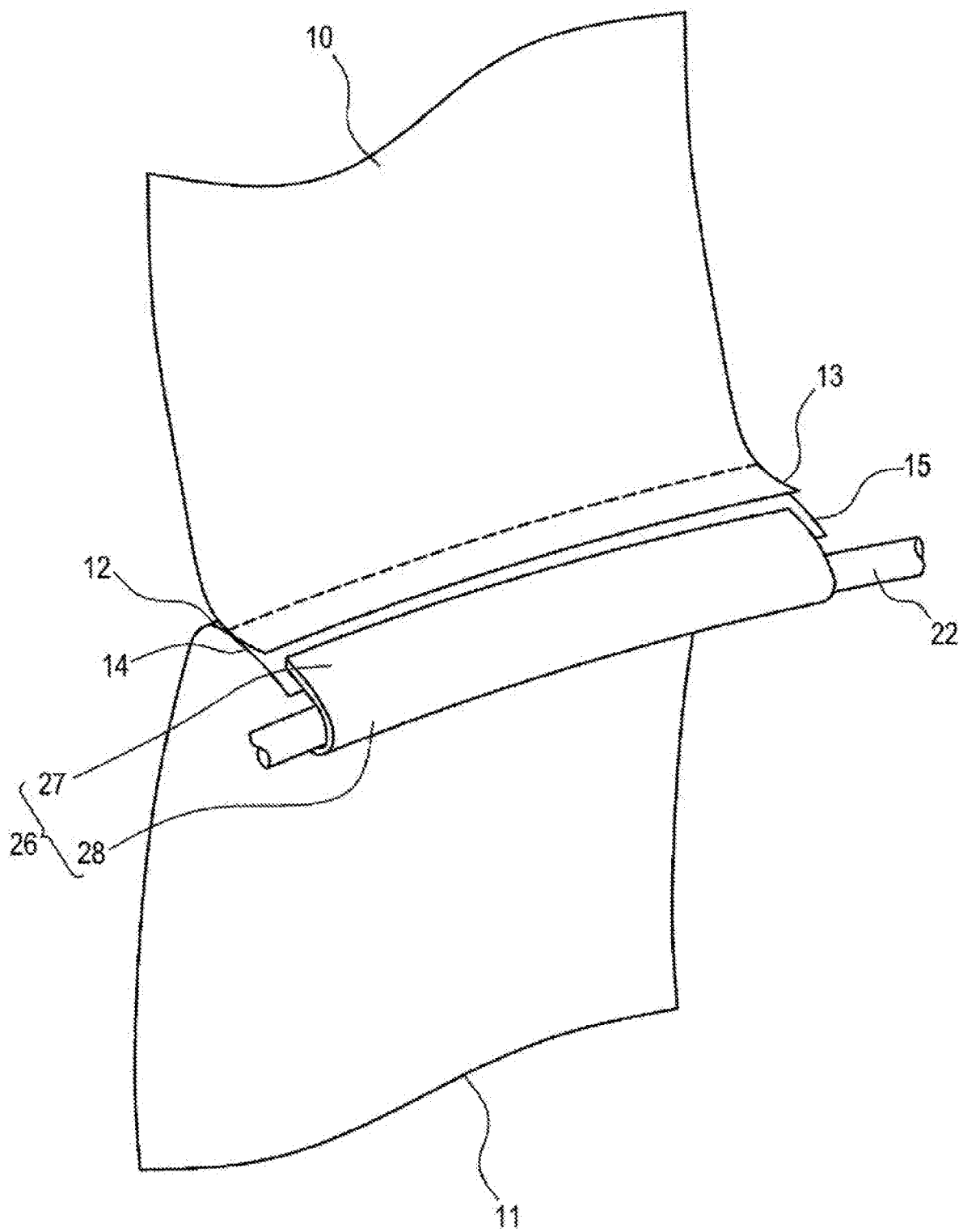
FIG. 5 is a perspective view of a back surface side of another modification of the seat cover of FIG. 1.

Hereinbefore, in the description, the locked part of the sewn portion 12 locked by the wire 22 of the pulling-in groove 21 is formed of the hole 23 bored in the protrusion part 15 or is formed of the hole 23 and the reinforcement member 25, and is locked in the wire 22 through the hook ring 24. However, as illustrated in FIG. 5, the locked part of the sewn portion 12 may be a hook member 26 directly engageable in the wire 22.

The hook member 26 includes a plate-shaped base part 27 which is joined to the protrusion part 15 and a hook part 28 which extends from the base part 27, and is formed to have a substantially J-shaped cross section. The hook member 26 is a resin member, for example. The base part 27 is joined to the protrusion part 15 by sewing or adhering. The hook part 28 is caught in the wire 22 of the pulling-in groove 21, so that the protrusion part 15 is connected with the wire 22.

The hook member 26 as a locked part is directly engageable in the wire 22, and the hook ring 24 caulked by the wire 22 is not necessary. Thus, it is possible to further reduce the number of the components, and to reduce the workload required for the pulling-in.

Incidentally, in the illustrated example, the hook member 26 is provided continuously over the entire length of the protrusion part 15. Thus, for example, in a case where the sewn portion 12 and the pulling-in groove 21 are curved, a plurality of hook members may be provided with a proper interval interposed in the extending direction of the protrusion part 15.

Figure 6:
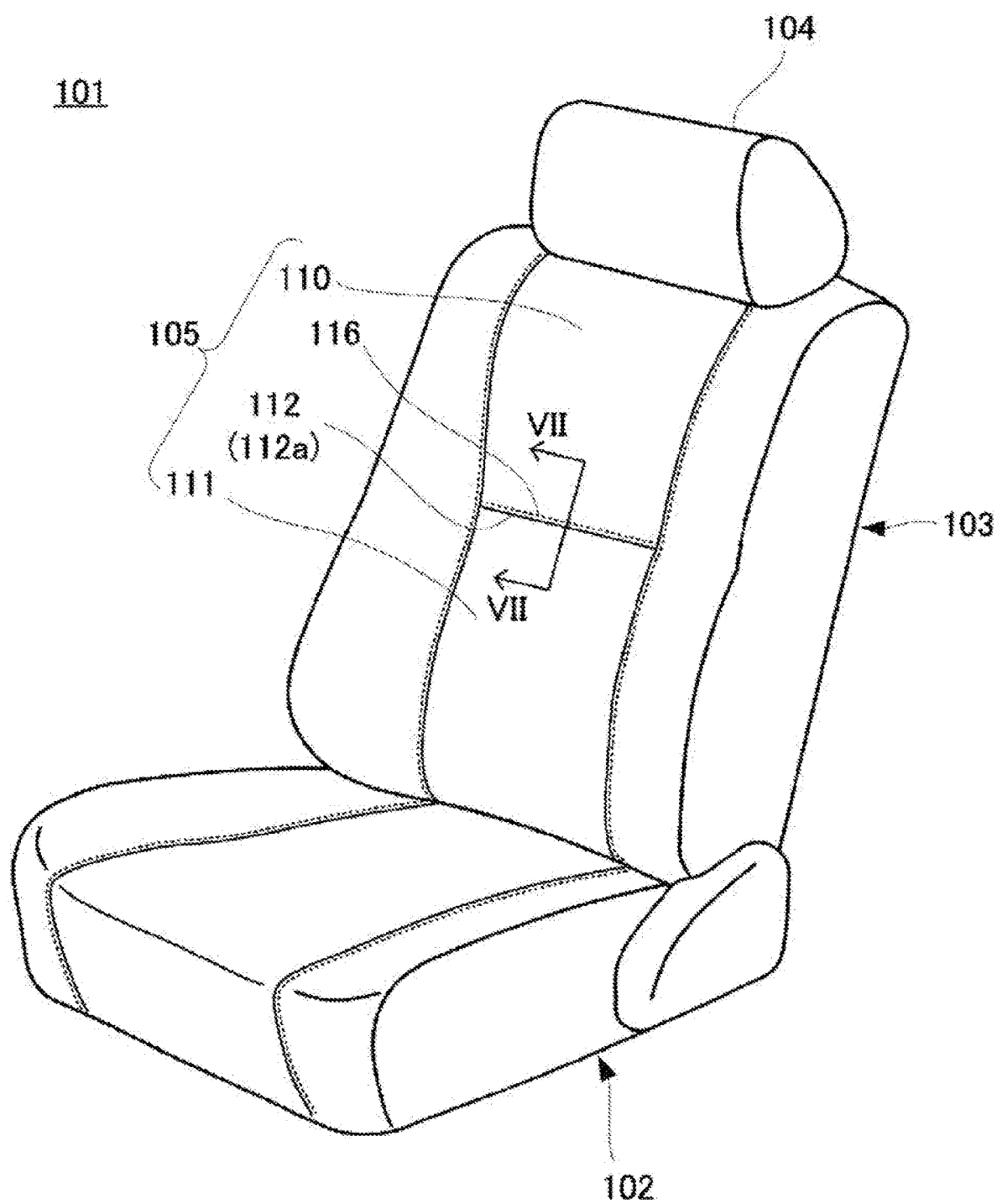
FIG. 6 is a perspective view of another example of a seat cover and a vehicle seat for describing an embodiment of the invention.

FIG. 6 illustrates a configuration of another example of the vehicle seat for describing the embodiment of the invention.

A vehicle seat 101 illustrated in FIG. 6 includes a seat cushion 102, a seat back 103, and a headrest 104. The cushion pad of the seat cushion 102 and the cushion pad of the seat back 103 are integrally covered with the seat cover 105, and the headrest 104 is also covered with a seat cover separately from the seat cover 105.

Among the plurality of skin materials forming the seat cover 105, two sheets of a skin material 110 and a skin material 111 are skin materials which cover the center support portion of the substantially widthwise central portion of the seat back 103, and the skin material 110 and the skin material 111 are sewn with each other. A sewn portion 112 of the skin material 110 and the skin material 111 which are sewn with each other is pulled into the cushion pad of the seat back 103.

A stitch 116 which extends along a seam 112a over the entire length of the seam 112a where the skin material 110 and the skin material 111 is sewn is formed in the skin material 110.

Figure 7:
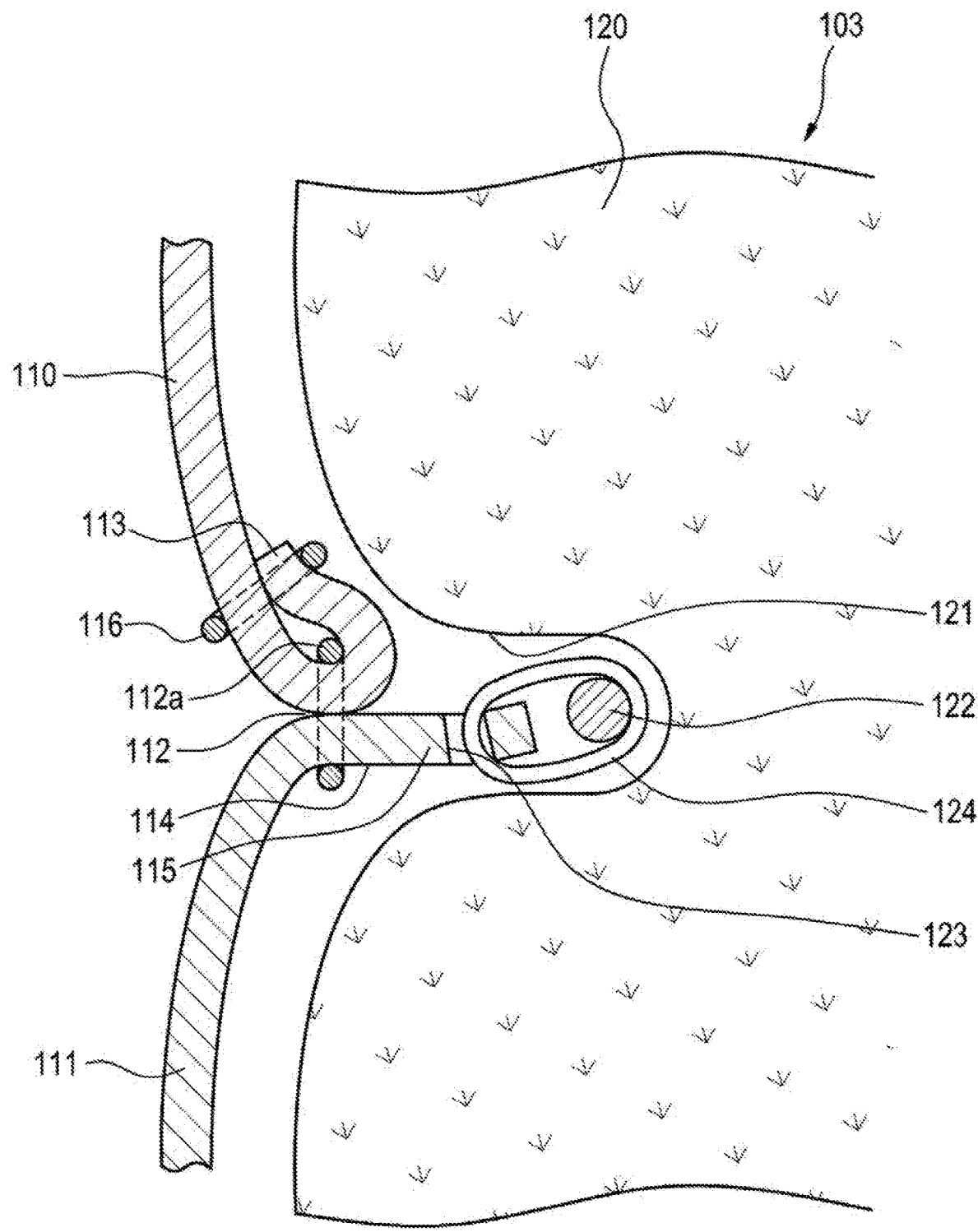
FIG. 7 is a sectional view taken along line VII-VII of the vehicle seat of FIG. 6.

As illustrated in FIG. 7, a pulling-in groove 121 which extends along the sewn portion 112 of the skin material 110 and the skin material 111 and a wire 122 which is arranged in the bottom of the pulling-in groove 121 are provided in the cushion pad 120 of the seat back 103.

A protrusion part 115 which is arranged to protrude from a seam allowance 113 of the skin material 110 in the pulling-in direction of the sewn portion 112 into the pulling-in groove 121 is provided in a seam allowance 114 of the skin material 111 among the seam allowance 113 of the skin material 110 and the seam allowance 114 of the skin material 111 which are arranged on the back surface side of the seat cover 105.

In this example, the seam allowance width of the seam allowance 114 of the skin material 111 is the same as the seam allowance width of the seam allowance 113 of the skin material 110. The seam allowance 113 is sewn on the skin material 110 by the stitch 116 in the state of being folded back along the seam 112a, so that the protrusion part 115 is provided in the seam allowance 114.

A plurality of holes 123 as a locked part which is locked in the wire 122 provided in the pulling-in groove 121 are bored in the protrusion part 115 of the seam allowance 114. Hook rings 124 are inserted into the respective holes 123, and the hook rings 124 are caulked by the wire 122 provided in the pulling-in groove 121. The protrusion part 115 is connected with the wire 122 through the hook ring 124, and the sewn portion 112 of the skin material 110 and the skin material 111 including the protrusion part 115 is pulled into the pulling-in groove 121 by the tension of the wire 122.

In the above-described seat cover 105, the seam allowance 113 of the skin material 110 is sewn on the skin material 110 by the stitch 116 in the state of being folded back along the seam 112a, so that the protrusion part 115 is provided in the seam allowance 114 of the skin material 111. The protrusion part 115 provided as above can be shortened compared to the protrusion part 15 illustrated in FIGS. 2 and 3, that is, the protrusion part 15 which is provided in the seam allowance 14 in a state where the seam allowance width W2 of the seam allowance 14 of the skin material 11 is enlarged compared to the seam allowance width W1 of the seam allowance 13 of the skin material 10. Accordingly, the pulling-in groove 121 becomes shallow, and it is possible to further reduce the workload for connecting the protrusion part 115 of the seam allowance 114 with the wire 122 of the pulling-in groove 121.

Incidentally, when the seam allowance 113 of the skin material 110 is folded back along the seam 112a to be sewn on the skin material 110, and further the seam allowance width of the seam allowance 114 of the skin material 111 is enlarged compared to the seam allowance width of the seam allowance 113 of the skin material 110, the protrusion part 115 can be provided in the seam allowance 114.

As the configuration of the locked part provided in the protrusion part 115, the configuration of the hole 23 and the reinforcement member 25 which are illustrated in FIG. 4 can be adopted, and the hook member 26 illustrated in FIG. 5 can be adopted.

The stitch 116 formed in the skin material 110 is an ornamental element which contributes to the design of the vehicle seat 101 and is a functional element which sews the seam allowance 113 of the skin material 110 on the skin material 110. However, the skin material 111 may be further formed with a stitch as an ornamental element which extends along the seam 112a over the entire length of the seam 112a.

INDUSTRIAL APPLICABILITY

The invention is not limited to the seat mounted in the vehicle such as an automobile and also may be applied to a seat cover of another seat such as an office chair.

DESCRIPTION OF REFERENCE NUMERALS AND SIGNS

1: vehicle seat
2: seat cushion
3: seat back
4: headrest
5: seat cover
10: skin material
11: skin material
12: sewn portion
13: seam allowance
14: seam allowance
15: protrusion part
20: cushion pad
21: pulling-in groove 22: wire (locking part)
23: hole (locked part)
24: hook ring
25: reinforcement member (locked part)
101: vehicle seat
102: seat cushion
103: seat back
104: headrest
105: seat cover
110: skin material
111: skin material
112: sewn portion
112a: seam
113: seam allowance
114: seam allowance
115: protrusion part
116: stitch
120: cushion pad
121: pulling-in groove
122: wire (locking part)
123: hole (locked part)
124: hook ring

The invention claimed is:

1. A seat cover which is formed by sewing a plurality of skin materials, the seat cover comprising:
a locked part which is provided in a sewn portion of two sheets of sewn skin materials and is locked in a locking part of a cushion pad in a state where the sewn portion is pulled into a pulling-in groove extending along the sewn portion of the cushion pad of a seat covered with the seat cover, wherein:
among seam allowances of the two sheets of skin materials included in the sewn portion, a seam allowance of one of the two sheets of skin materials includes a protrusion part which is arranged in at least partial section in an extending direction of the seam allowance to protrude in a pulling-in direction of the sewn portion from a seam allowance of the other of the two sheets of skin materials, the one of the two sheets of skin materials, including the protrusion part, having a one-piece structure;
a seam allowance width of the seam allowance of the one of the two sheets of skin materials in the section provided with the protrusion part is larger than a seam allowance width of the seam allowance of the other of the two sheets of skin materials; and
the locked part is directly provided in the protrusion part.

2. The seat cover according to claim 1, wherein
the seam allowance of the other of the two sheets of skin materials is sewn to the other of the two sheets of skin materials in a state of being folded back along a seam where the two sheets of skin materials are sewn.

3. The seat cover according to claim 1, wherein
the locked part includes a hole bored in the protrusion part.

4. The seat cover according to claim 3, wherein
the locked part includes a reinforcement member which is provided at least in an edge side of the protrusion part in a vicinity of the hole and joined to the protrusion part.

5. The seat cover according to claim 1, wherein
the locked part includes a hook member joined to the protrusion part.

6. A vehicle seat comprising:
a seat cover, which is formed by sewing a plurality of skin materials, including: a locked part which is provided in a sewn portion of two sheets of sewn skin materials; and
a cushion pad, covered with the seat cover, including: a pulling-in groove which extends along the sewn portion of the seat cover; and a locking part which is provided in the pulling-in groove, wherein:
the locked part of the seat cover is locked in the locking part of the cushion pad in a state where the sewn portion is pulled into the pulling-in groove;
among seam allowances of the two sheets of skin materials included in the sewn portion, a seam allowance of one of the two sheets of skin materials includes a protrusion part which is arranged in at least partial section in an extending direction of the seam allowance to protrude in a pulling-in direction of the sewn portion from a seam allowance of the other of the two sheets of skin materials, the one of the two sheets of skin materials, including the protrusion part, having a one-piece structure;
a seam allowance width of the seam allowance of the one of the two sheets of skin materials in the section provided with the protrusion part is larger than a seam allowance width of the seam allowance of the other of the two sheets of skin materials; and
the locked part is directly provided in the protrusion part.

* * * * *